United States Patent
McCutchen (10) Patent No.: US 7,757,866 B2
(45) Date of Patent: Jul. 20, 2010

(54) ROTARY ANNULAR CROSSFLOW FILTER, DEGASSER, AND SLUDGE THICKENER

(75) Inventor: Wilmot H. McCutchen, Orinda, CA (US)

(73) Assignee: McCutchen Co., Portland, OR (US)

( * ) Notice: Subject to any disclaimer, the term of this patent is extended or adjusted under 35 U.S.C. 154(b) by 447 days.

(21) Appl. No.: 12/004,308

(22) Filed: Dec. 20, 2007

(65) Prior Publication Data

US 2009/0159523 A1 Jun. 25, 2009

(51) Int. Cl.
*B01D 19/00* (2006.01)
*C02F 1/38* (2006.01)

(52) U.S. Cl. .................. 210/512.3; 95/253; 95/261; 95/30; 96/175; 96/182; 96/196; 96/216; 96/219; 210/748.03; 210/748.11; 210/167.13; 210/365; 210/781

(58) Field of Classification Search .............. 95/253, 95/261, 30; 96/175, 182, 196, 216, 217, 96/219; 210/748.03, 748.11, 512.3, 167.13, 210/365, 781
See application file for complete search history.

(56) References Cited

U.S. PATENT DOCUMENTS

| | | | |
|---|---|---|---|
| 3,468,614 A * | 9/1969 | Nilsson | 431/2 |
| 3,990,631 A | 11/1976 | Schall | |
| 4,044,943 A | 8/1977 | Brown et al. | |
| 4,076,617 A | 2/1978 | Bybel et al. | |
| 4,186,089 A | 1/1980 | Okada | |
| 4,454,101 A | 6/1984 | Garrison et al. | |
| 4,604,109 A * | 8/1986 | Koslow | 95/248 |
| 4,846,780 A | 7/1989 | Galloway et al. | |
| 4,925,557 A | 5/1990 | Ahlberg, Jr. et al. | |
| 5,073,262 A * | 12/1991 | Ahlberg et al. | 210/321.68 |
| 5,143,630 A | 9/1992 | Rolchigo | |
| 5,254,250 A | 10/1993 | Rolchigo et al. | |
| 5,390,740 A | 2/1995 | Woerheide | |
| 5,494,585 A | 2/1996 | Cox | |

(Continued)

OTHER PUBLICATIONS

Notification of Transmittal of the International Search Report and the Written Opinion of the International Searching Authority, or the Declaration, Feb. 9, 2009, PCT/US08/85916, 13 pgs.

(Continued)

*Primary Examiner*—Duane Smith
*Assistant Examiner*—Douglas J Theisen
(74) *Attorney, Agent, or Firm*—Marger Johnson & McCollom, PC (57) ABSTRACT

In an embodiment, axially-fed slurry can be continuously separated into clarified liquid, stripped gas, and thickened sludge in radial counterflow between counter-rotating coaxial centrifugal impellers. One impeller comprises an annular crossflow filter through which liquids are extracted. At the periphery of the impellers, where they are narrowly separated, the sludge is shear thickened into an extruded paste. Suspended solids in the feed pass over the surface of the rotating annular crossflow filter by the shear lift effect, and the vortex-wall interaction jets water radially inward from the periphery, dewatering the sludge. Evolved gases, oils, and fractions lighter than water flow radially inward to the impeller axis through radial vortices in a shear layer between the impellers, and are extracted through an axial exhaust conduit. Feed has long residence time so that separation is complete and continuous. Municipal wastewater, produced water, beverages, food, and scrubber sludge are discussed.

19 Claims, 7 Drawing Sheets

U.S. PATENT DOCUMENTS

| | | | |
|---|---|---|---|
| 5,534,118 | A | 7/1996 | McCutchen |
| 5,679,249 | A | 10/1997 | Fendya et al. |
| 5,688,377 | A | 11/1997 | McCutchen |
| 5,746,789 | A | 5/1998 | Wright et al. |
| 5,882,530 | A | 3/1999 | Chase et al. |
| 5,993,674 | A | 11/1999 | Rolchigo et al. |
| 6,106,713 | A | 8/2000 | Miller et al. |
| 6,117,322 | A | 9/2000 | Miller et al. |
| 6,149,573 | A | 11/2000 | Berger et al. |
| 6,210,575 | B1 | 4/2001 | Chase et al. |
| 6,221,260 | B1 | 4/2001 | Chahine et al. |
| 6,376,558 | B1 | 4/2002 | Bahner et al. |
| 6,478,969 | B2 | 11/2002 | Brantley et al. |
| 6,808,634 | B1 | 10/2004 | Zegg |
| 6,827,820 | B1 | 12/2004 | Meinander |
| 6,872,301 | B2 | 3/2005 | Schepis |
| 6,875,351 | B2 | 4/2005 | Arnaud |
| 6,916,425 | B2 | 7/2005 | Lotz et al. |
| 6,966,874 | B2 | 11/2005 | Cornay et al. |
| 7,029,584 | B2 | 4/2006 | Blase et al. |
| 7,056,437 | B2 | 6/2006 | Schmid et al. |
| 7,247,244 | B2 | 7/2007 | Kozyuk |
| 7,306,737 | B2 | 12/2007 | Langenecker |
| 2003/0192831 | A1 * | 10/2003 | Langenecker ............... 210/663 |
| 2007/0045168 | A1 | 3/2007 | Levitt et al. |

OTHER PUBLICATIONS

Perlmutter, Comparison of Gypsum Dewatering Technologies at Flue Gas Desulfurization Plants, Presented at the 45th ISA Power Industry Division (POWID) Conference San Diego, California, Jun. 2-7, 2002, 9 pgs.

Tarrer, Development of a New Gravity Sedimentation Process for Dewatering Flue Gas Cleaning Wastes, EPA-600/S7-84-084, Sep. 1984, 5 pgs.

Holland et al., Filtration of Aliphatic Base Oils With VSEP, http://www.vsep.com/pdf/AliphaticBaseOils.pdf, 9 pgs.

Chen et al., Fractal-like Tree Networks Increasing the Permeability, Physical Review E 75, 056301, May 1, 2007, 8 pgs.

Shtern et al., Collapse, Symmetry Breaking, and Hysteresis in Swirling Flows, Annu. Rev. Fluid Mech. 1999, 31:537-66, 31 pgs.

Zandbergen et al., Von Karman Swirling Flows, Ann. Rev. Fluid Mech. 1987, 19:465-91, 28 pgs.

* cited by examiner

ROTARY ANNULAR CROSSFLOW FILTER, DEGASSER, AND SLUDGE THICKENER

BACKGROUND OF THE INVENTION

The present invention relates to municipal and industrial wastewater processing, to cleaning of produced brine and fluid waste created by oil and gas production, to field water purification, to food and beverage processing, and generally to mechanical means for three way phase separation. It also relates to high shear moving filter crossflow filtration, degassifiers, beverage clarifiers, and sludge thickeners.

Three way phase separation divides a feed of a fluid mixture into three streams: gases, liquids, and solids. The present invention performs three way phase separation in a continuous process in one pass through a single simple device, without added heat or chemicals.

The term phase is commonly understood to apply to a state of a substance. For example, water can exist in the gaseous state as steam, in the liquid state as water, and in the solid state as ice. However, in the present disclosure the term phase will be more broadly defined as follows: Noncondensible gases, vapors, and liquids having a specific gravity or density less than a desired liquid filtrate (e.g. light oils, which have a specific gravity less than the desired filtrate water) will be referred to as light fractions. Light fractions constitute one phase, referred to collectively as gases even though some liquids may be included. A desired liquid filtrate is a second phase, referred to as liquid. Suspended solids, colloids, and liquids having a density or viscosity greater than the desired filtrate (e.g. heavy oils which are denser than produced brine) are a third phase, solids, which when agglomerated become sludge.

Gases may include liquid hydrocarbons having a specific gravity less than water, such as gasoline and olive oil, and condensible vapors from volatile organic compounds (VOCs) or solvents, as well as noncondensible gases such as oxygen, hydrogen sulfide, chlorine, nitrous oxide, methane, and carbon dioxide. Liquid may include potable water, brine, oil, juice, beer, wine, and process water. Solids may include clay, yeast, pomace, olive pits, seeds, stems, suspended solids from flue gas wet scrubbing, precipitate, scale, aliphatic compounds, metal particles, algae, mud, blood cells, and microbes. The foregoing lists are meant to be illustrative, not limiting or exhaustive.

An example where the need for three way phase separation exists is the winemaking industry. Wine needs to be cleaned of gases and solids.

Dissolved oxygen causes oxidation, and dissolved carbon dioxide causes carbonation, both of which detract from wine quality. Extracting dissolved carbon dioxide prior to bottling is conventionally practiced by stirring the wine with a paddle, but this primitive expedient has the disadvantage of mixing in atmospheric nitrogen and oxygen.

To remove yeast and other suspended solids in wine, fining agents such as bentonite clay are added and sweep the wine as they slowly settle by gravity. After settlement, there is a thick layer of lees at the bottom of the settlement tank. Most of the lees are delicate flocs having a high wine content, which is wasted if the lees are discarded. Filtration of wine carefully siphoned off the top of the lees is conventionally by means of dead end filters, which clog and must be cleaned or discarded.

Winery waste, such as lees, clogged filters, and pomace, is a significant disposal problem. Because of high liquid content, such waste cannot be burned and it is heavy. The fruit and olive processing industry has a similar need for effective thickening means to extract liquid content from pomace and lees, both to increase production and to reduce the waste transport problem.

For olives, three way phase separation involves separating olive oil, water, and pomace. Preferably, as disclosed in the present invention, the fruit is broken up at the same time to release the oil. A high shear tumbling device would be preferable to a mashing device, which may cause release of unwanted seed flavors into the oil.

An example where the need for three way phase separation exists for industrial wastewater is effluent from wet scrubbing of the sulfur dioxide in coal-fired power plant flue gas. There is also fly ash slurry produced by wet scrubbing of fly ash from flue gas. Sulfur dioxide produces acid rain and there are strict limits on emissions. Conventionally, removal of sulfur dioxide from flue gas is done by spraying a limestone and water mixture into the flue gas. Limestone reacts with sulfur dioxide dissolved in the water to form carbon dioxide and a gypsum slurry. The reaction depends on contact of the reagents, and $SO_2$ is in low concentration (less that 1%), so the spray must be retained in voluminous ponds or settlement tanks while the reactions continue and gypsum forms and settles. Settlement by gravity takes a long time, requires a large footprint, and still leaves a voluminous cloudy stratum of fine solids which are too small to settle compactly by gravity.

Another example for industrial wastewater is effluent from machining operations. Cutting fluids, oils, solvents, metal particles, rust, dirt, and various pollutants need to be separated from the wastewater, preferably allowing the water in the effluent to be recycled through the plant. The presence of oils complicates the separation task because oils retard settlement of the solids and blind dead end filters. Volatile organic compounds such as solvents in the effluent also need to be separated from the water. In this case, three phase separation divides the effluent into three divergent streams: recoverable or easily disposable solids, recyclable water, and a light fraction stream of oils and solvents.

Municipal wastewater requires three way phase separation to produce three divergent streams: thickened sludge, water, and a light fraction stream of oils, suds, VOCs, and noncondensible gases. The water in so-called wastewater is really a potential resource which may be recovered for use. The solids phase includes fecal matter, bacteria, amoebas, dirt, metals, tar, and a wide variety of suspended solids, and it should also be thickened as well as separated. The light fraction stream includes mercury vapor, vapor or condensate of volatile organic compounds (VOCs) including cyanide, oils, emulsions, and soap suds. The light fraction stream also includes noncondensible gases, including hydrogen sulfide ($H_2S$, commonly known as sewer gas), dissolved residual chlorine ($Cl_2$) from chlorination, methane ($CH_4$), nitrous oxide ($N_2O$), and nitrogen ($N_2$) from denitrification. The light fraction stream should be captured rather than dumped into the atmosphere.

Methane is of recent concern for wastewater treatment plants because it is a potent greenhouse gas, 23 times more potent than carbon dioxide, and because its capture and combustion in power generators increases the energy efficiency of the plant. Another reason to extract methane from wastewater is that methane combines with ammonia in wastewater to form hydrocyanic acid (also known as prussic acid, the Nazi poison Zyklon B). Commercially, this is known as the BMA process.

Cyanide is the anion CN—. In water, the cyanide anion becomes hydrogen cyanide (HCN). The boiling point of hydrogen cyanide is 26° C., which makes it highly volatile, i.e. it can be separated from water by low pressure, which causes HCN to become a gas. HCN has a density of 0.687 g/cm$^3$, which is much less dense than water, and therefore HCN can be separated from water by density as well as by volatility. Other cyanide compounds are: cyanogen (NCCN), which becomes hydrogen cyanide (HCN) in water, and has a boiling point of −20.7° C.; cyanogen chloride (13.8° C.); and acetone cyanohydrin (82° C.). Note that all of these have lower boiling points than water (100° C.), i.e. they are volatile organic compounds. All cyanide species are considered to be acute hazardous materials and have therefore been designated as P-Class hazardous wastes. The remediation target for cyanide in wastewater is 1 μg/L (one part per billion), which is unattainable with presently known treatment technologies, even ultrafiltration, which at best can get to 10 μg/L and are prohibitively expensive.

Other noxious volatile organic compounds (VOCs) in municipal and industrial wastewater are benzene, toluene, and xylene; collectively, these are referred to as BTX. Like cyanide, these are much more volatile than water, have lower viscosity, and have lower density (approximately 0.87 g/cm$^3$ compared to water which is 1 g/cm$^3$). VOCs are very potent greenhouse gases and should be captured rather than vented to the atmosphere.

Dissolved dinitrogen gas ($N_2$) causes algae bloom and fish die-off downstream, as well as "blue baby" syndrome in humans. Nitrogen gas in municipal wastewater comes from microbial decomposition of waste, and denitrification of wastewater so as to extract nitrogen gas is an important step in treatment. Dinitrogen gas is harmless in the atmosphere, but nitrous oxide ($N_2O$) is a very potent greenhouse gas, 296 times worse than carbon dioxide.

Settlement of sewage in ponds is slow and cannot remove fine solids. Sewage ponds are large stagnant toxic traps for waterfowl. Wasted space and long residence time are other disadvantages of pond settlement. Methane (from anaerobic processes), nitrous oxide, and carbon dioxide (from aerobic processes) emissions from municipal waste settlement ponds contribute to the global climate change problem.

The sludge produced by sewage settlement is still very wet. Sludge thickening in municipal wastewater plants, or other facilities, is conventionally practiced by drying, which requires heat from fossil fuels and contributes significantly to the energy load of the plant.

Shear thickening is a phenomenon in rheology where a fluid stiffens when suddenly sheared. Water is not shear thickening, but rather is, like most fluids, Newtonian, i.e. the dynamic viscosity of water is independent of shear rate. An example of a shear thickening fluid is wet sand, which can support a car driven over it, but cannot support a car parked on it. Clay slurries, fly ash slurries, and gypsum slurries are also shear thickening fluids. Such non-Newtonian fluids are called by various names, including dilatant or rheopectic. As disclosed in the present invention, shear in periodic pulses can also dewater sludges, which is another mechanism for shear thickening.

Crossflow filters avoid the principal disadvantage of dead end filters, which is blinding of the filter medium by accumulated solids. Filter blinding requires downtime and expense for replacing or cleaning the filters. Devices having rapidly moving filter surfaces are called high shear crossflow filters because their mechanically driven shear rate (>100,000 sec$^{-1}$) is in excess of the limit (~10,000 sec$^{-1}$) of what is possible using crossflow due to pressure driven feed velocity across the filter medium. High shear crossflow filters causes a shear lift force, which advects suspended solids away from the filter medium.

U.S. Pat. No. 6,478,969 to Brantley, et al. (2002) discloses a fractionation method and system balancing shear lift force from a smooth membrane against the permeate drag force (due to flow through the membrane) to select a particle size in the filtrate. Multidisk rotary microfilter devices are disclosed in U.S. Pat. No. 6,872,301 to Schepis (2005), U.S. Pat. No. 4,925,557 to Ahlberg, et al. (1990) and U.S. Pat. No. 5,073,262 to Ahlberg, et al. (1991). Said high shear crossflow filters comprise a cylindrical tank containing a plurality of hollow filter disks mounted on a rotating hollow shaft, with feed peripheral to the disks and filtrate flow through the interior of the disks to the hollow shaft. Viscous diffusion of momentum from the spinning disks produces an envelope of water purified by shear lift force, which is squeezed by feed pressure through the disk membranes into the disk interiors and the shaft bore. The disks have small radii, therefore the multiple disk assembly must be rotated at a high angular velocity (>1000 rpm) to achieve a high shear rate for producing sufficient separatory shear lift force.

High angular velocity devices such as the multidisk rotary crossflow filter, wherein the rotor and its adherent envelope of spinning water is of variable mass due to variable fluid flow, present difficult engineering challenges and dangers. A problem with all centrifuges is wobble due to axial instability in a rapidly rotating device. An example is the spin cycle on a washing machine, where if the clothes are not evenly distributed around the axis of rotation the spinning causes wobble and the machine shuts down to avoid catastrophe. Where the centrifuge radius is small, accurate mass distribution about the axis of rotation is important to prevent wobble at high speeds. Another difficulty of multidisk rotary microfilters is the centrifugal concentration of filter-blinding oils in the envelope.

Field purification of drinking water is conventionally practiced by adding chemicals to pretreat the feed and then filtering the treated feed through a very small pore membrane under very high pressure (reverse osmosis, also known as ultrafiltration). Chemicals are necessary to disinfect the feed and to eliminate scale-forming compounds such as calcium carbonate. Reverse osmosis is expensive due to: (1) high energy consumption in generating the high pressure, (2) complicated and expensive pretreatment, and (3) the need for downtime and expensive component replacement when the small pore membranes inevitably clog from precipitated scale, oils, and particles. Although there is some crossflow over the membrane due to feed pressure, the shear rate is relatively small compared to the rotary microfilter because the feed velocity is much smaller than the spinning disk tangential velocity. The feed velocity is inadequate to sweep accumulated solids off of the membrane.

Rotating or vibrating long and narrow cylindrical RO membranes by mechanical means would improve the shear rate somewhat but might rip delicate membranes by shear stress or cavitation damage. Also, rotation of a small diameter cylinder at a reasonably safe angular velocity can produce only a small tangential velocity at the membrane and therefore a small shear lift force.

As a solution to the critical need in developing countries for potable water, reverse osmosis field purification is ultimately unsatisfactory because of its high energy consumption and its technical complexity. Chemicals and replacement membranes are expensive and may not be reliably available through existing distribution channels, particularly in remote-locations. Maintenance requires a technological infrastructure which is not present. There is a long felt but unmet need for simple mechanical means for three way phase separation to produce potable water from feed contaminated by microbes, mud, algae, worms, snails, bacteria, waste material, foul smelling gases, and oil.

Dewatering nuclear waste is an important separation application. The best means presently known to the art is multidisk rotary microfiltration through sintered stainless filters, following chemical pretreatment. See M. Poirier, "Evaluation of Solid-Liquid Separation Technologies to Remove Sludge and Monosodium Titanate from SRS High Level Waste," (2000).

SUMMARY OF THE INVENTION

Counter-rotating coaxial centrifugal impellers, fed at their axis of rotation, continuously and simultaneously separate a feed into three streams: (1) solids in a shear-thickened sludge extruded at the periphery of the impellers, (2) evolved gas, oils and other light fractions extracted at the impeller axis of rotation, and (3) liquid squeezed through an annular high shear radial crossflow filter in at least one of the impellers. High volume, high turbidity feed streams can be processed in a simple mechanical device without chemical pretreatment and without filter clogging. High shear lift force expels suspended solids from the boundary layer against the annular high shear filter, and radial flow of feed over the boundary layer sweeps away the expelled solids.

The annular high shear crossflow filter shears the feed in a plane parallel to the radially outward feed flow between the impellers. Dynamically rejected suspended solids are centrifuged by both impellers to the impeller periphery and agglomerated in high turbulence. At the periphery, a concentrated slurry is sheared between closely spaced rugose surfaces so as to form a thick sludge. Liquid is ejected from the periphery by back pressure due to the vortex-wall interaction of radial vortices with the peripheral impedance, and eventually recirculates to the boundary layer against the rotating disk filter. Back pressure due to impeller rotation squeezes the boundary layer through the radial crossflow filter to produce a clarified and degassed filtrate.

Radial vortices in the feed flow between the centrifugal impellers provide sink flow conduits through the feed for continuous extraction of evolved gases, which are sucked out from between the impellers by an axial pump drawing a vacuum at the impeller axis of rotation. Oils, VOC vapors, and other light fractions ate also drawn through the radial vortices radially inward and axially extracted, while feed flows radially outward.

Implosion of audio frequency resonant cavitation bubbles destroys microbes and crushes fruits. The cavitation bubbles are not cushioned by evolved noncondensible gases because noncondensibles are axially extracted through the radial vortices. Therefore cavitation bubble collapse becomes very energetic, causing rupture of cell walls by locally generated high pressure pulses and irradiation by locally generated ultraviolet light pulses.

Applications of the device and method disclosed in the present invention include:

1. River or pond water contaminated by hydrogen sulfide, methane, chlorine, fecal matter, gasoline, oils, VOCs, amoebas, worms, mud, algae, or microbes so as to produce potable water in a field purification unit which can be run by human or animal power.

2. Beverages, including wine, beer, and juices, prior to bottling so as to remove yeast, suspended solids and dissolved gases.

3. Manure slurry and industrial wastewater, so as to concentrate a dewatered sludge and prevent methane emissions.

4. Municipal wastewater after pre-treatment, so as to extract dissolved chlorine, methane, nitrogen, cyanide, mercury, and VOCs and to concentrate suspended solids into a thickened sludge.

5. Crushing of grapes, olives, and other fruits, nuts, or vegetables so as to produce separate streams of oil, juice, and thickened sludge of pomace.

6. Slurries from gas scrubbing so as to produce a dewatered thick sludge and accelerate the scrubbing reaction by axially extracting product gases.

7. Marine graywater, to separate tar, oils, and liquids prior to discharge of brine.

8. Produced brine from oil and gas operations, to separate sand, tar, drilling mud, and aliphatic oils from brine and to recover gasoline from brine at the wellhead.

9. Cheese whey.

10. Paper mill white water or other fiber stock suspensions.

11. Bayer process red mud.

12. Precipitates from pharmaceutical or other chemical processes.

13. Crystals from solutions.

14. Slurry from coal mining, to recover particulate coal and clean the water of mercury, aromatic and volatile organic compounds.

15. Honey, to separate honey from wax and particulate matter.

16. Blood, to separate cells from plasma.

17. Dewatering nuclear waste.

DRAWING REFERENCE NUMERALS

1—feed source
2—axial feed conduit
3—axial chamber
4—bottom impeller
5—top impeller
6—radial passage
7—pinch section of radial passage
8—shear thickening section of radial passage
9—rugose portion of impellers
10—annular high shear crossflow filter
11—seal
12—support wheel
13—axial exhaust conduit 14—axial suction pump
15—drive wheel
16—drive wheel spindle
17—drive wheel motor
18—belt
19—belt capstan
20—sludge hopper
21—oil and light constituent receptacle
22—baffle
23—runner
24—top casing
25—oil conduit

DETAILED DESCRIPTION OF THE INVENTION

The following description of the preferred embodiment and alternative embodiment is not intended to limit the scope of the claims, but only to illustrate the invention so that it may be readily understood by those of ordinary skill in the art as they apply it to their problem. Many different embodiments of the three way phase separation disclosed in the present invention are possible, for many different applications. What the different embodiments have in common is defined by the claims, and it is the claims, not the embodiments, which define the invention.

Figure 1:
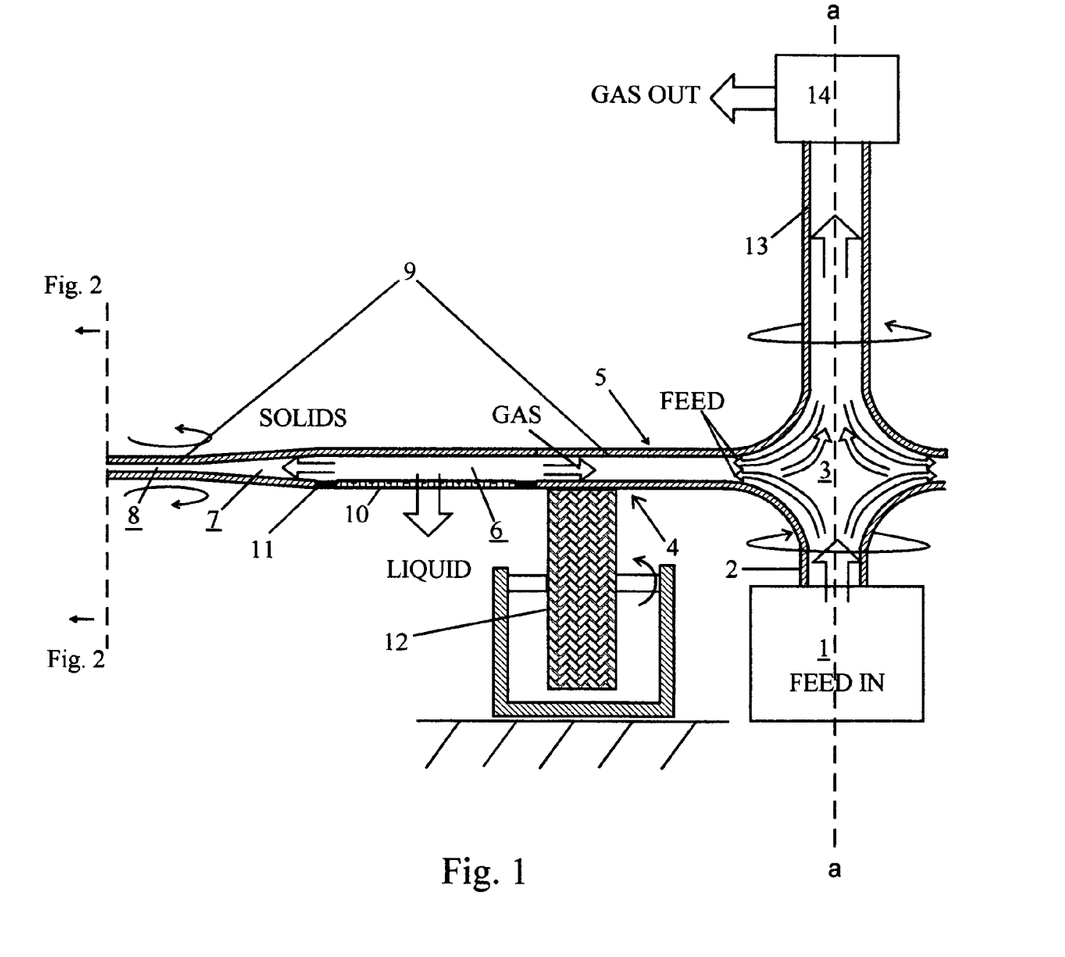
FIG. 1 shows a cross-sectional schematic view of part of the preferred embodiment, comprising counter-rotating centrifugal impellers, one of which comprises a high shear crossflow filter.
Figure 2:
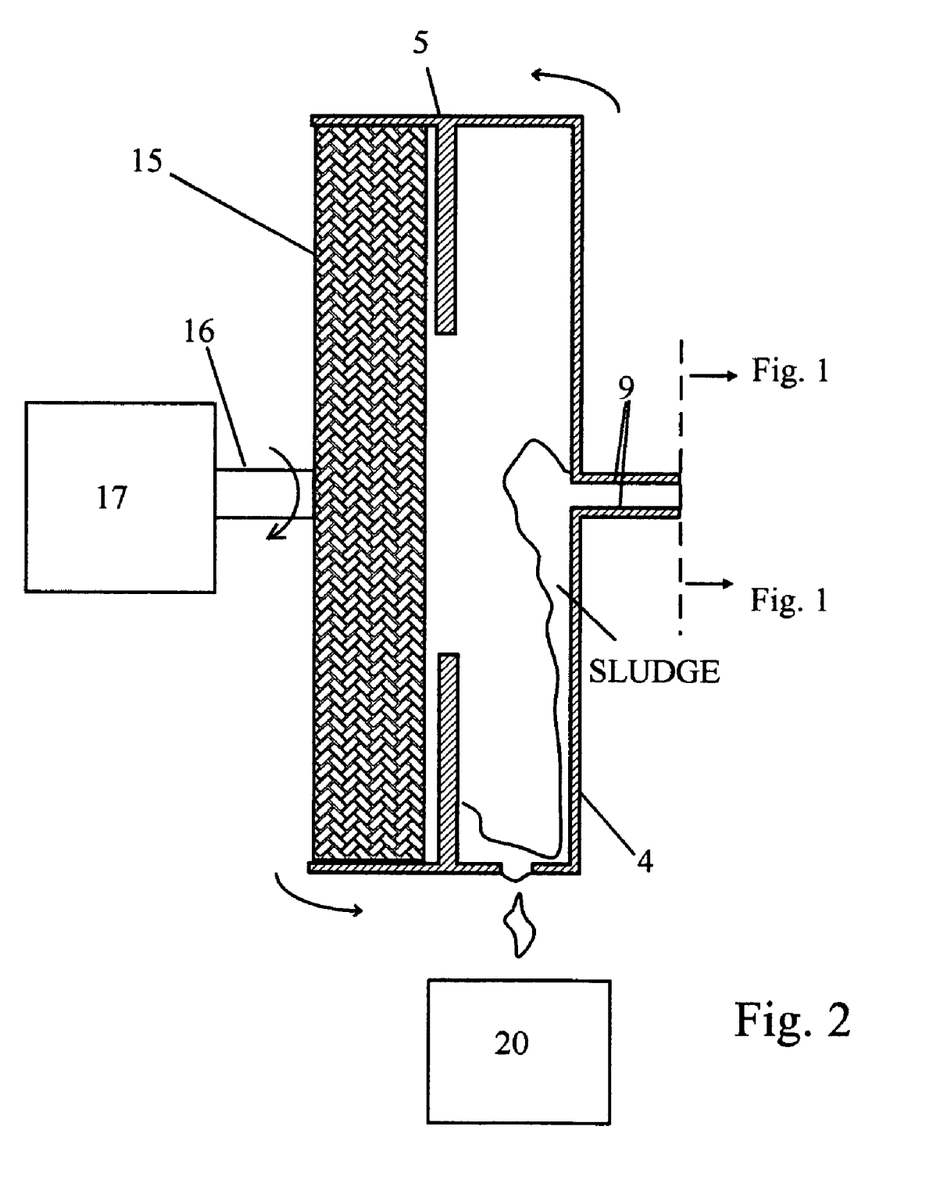
FIG. 2 shows a cross-sectional schematic view of the remainder of the preferred embodiment, showing the drive means for producing counter-rotation of the impellers.

FIG. 1 shows the preferred embodiment for municipal or industrial wastewater simultaneous degassing, filtration, and sludge thickening in a schematic cross-sectional view. FIG. 2 connects to FIG. 1 as shown by the dashed lines.

Referring now to FIG. 1, wastewater (referred to as feed) is a fluid mixture comprising the three phases of: (1) light fractions (including dissolved noncondensible gases, light oils, volatile organic compounds, and liquid constituents having a specific gravity less than water), (2) liquid water, and (3) suspended solids (including heavy oils and constituents having a specific gravity greater than water). Three way phase separation divides the feed into separate streams of light fractions, water, and solids. Feed from a feed source 1 flows through an axial feed conduit 2 into an axial chamber 3. The axial chamber is a space between a bottom impeller 4 and a top impeller 5 at their common axis of rotation a-a.

Advection of feed is caused by momentum transfer from the impellers 4, 5 and may be assisted by feed pump pressure caused by suitable means (not shown). A radial passage 6 between the impellers 4, 5 defines a flow path for feed radially outward from the axial chamber 3 and from the common impeller axis of rotation a-a. Each impeller acts as a centrifugal impeller. Said radially outward flow path comprises a boundary layer against each impeller, wherein fluid flows radially outward from the axis a-a, and a shear layer between the boundary layers, where fluid flow is turbulent but there is net inward radial advection of light fractions and a net outward radial advection of suspended solids. See FIG. 5a.

An array of radial vortex trees, which constitute a network of connected low pressure gradients, extends through the shear layer between the counter-rotating impellers 4, 5. Vortices of many scales, including fine scale eddy vortices at the periphery and large scale trunk-like radial vortices nearer the axis a-a, are connected into a tree due to the forcing regime of impeller counter-rotation and axial suction.

The present invention discloses an open system, having continuous mass flow in through the axial feed conduit 2 and out simultaneously through (1) the axial exhaust conduit 13, (2) the annular high shear crossflow filter 10, and (3) the shear thickening section 8. As an open system, it is different from closed systems such as von Karman swirling flow between exactly counter-rotating disks forming end caps of a closed cylinder having no means for continuous feed, which is used in investigations of magnetohydrodynamics.

Said radial vortices provide coherent conduits for said radially inward sink flow of light fractions. Feed swirls radially outward around the vortex cores as gases flow radially inward. Radially inward advection of gases and oils and other light fractions through the radial vortex cores and away from the annular high shear crossflow filter 10 is assisted by an axial pump 14, which operates while the impellers 4, 5 counter-rotate.

Figure 3:
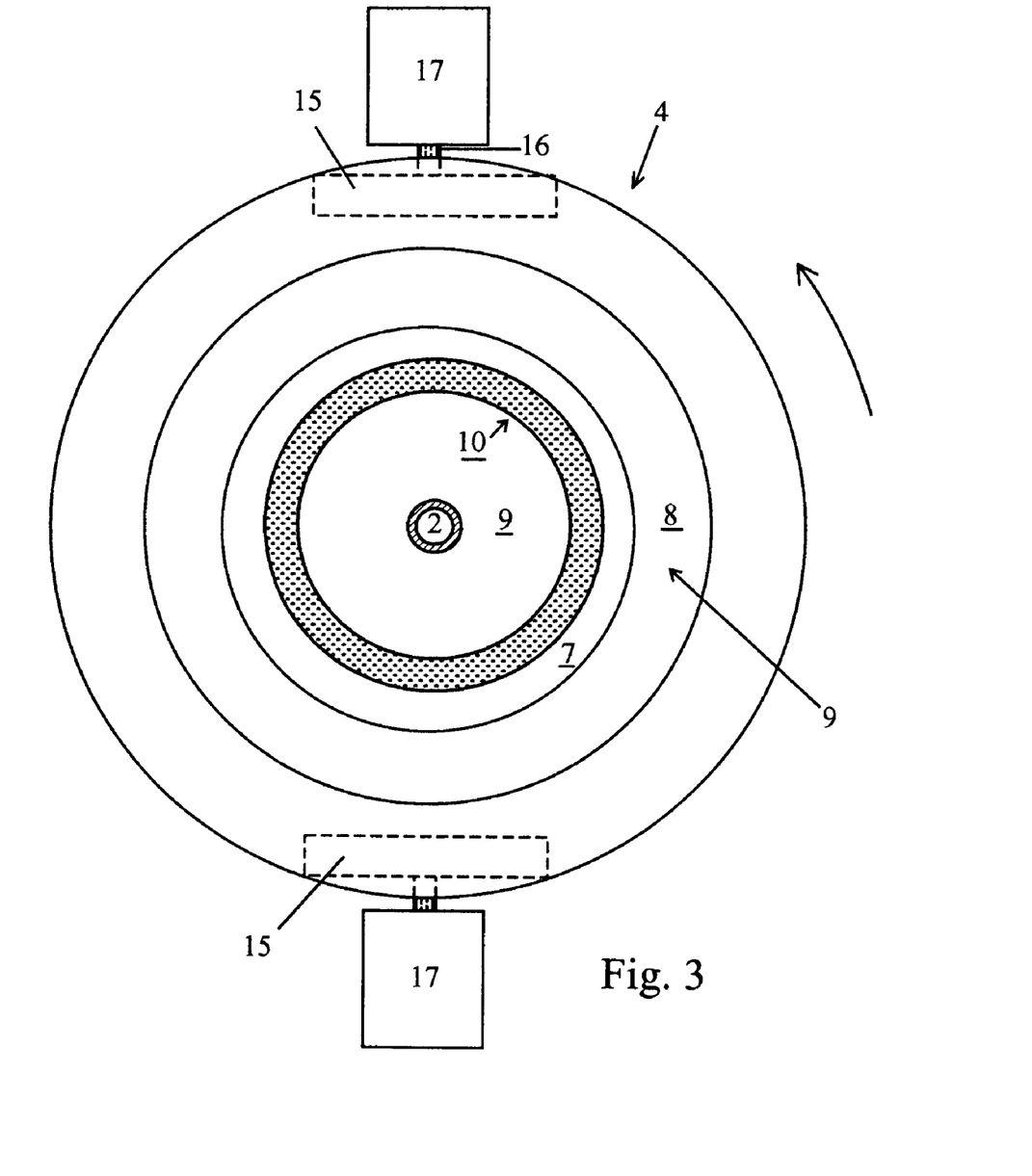
FIG. 3 shows a bottom view of the bottom impeller and its annular high shear crossflow filter.
Figure 6:
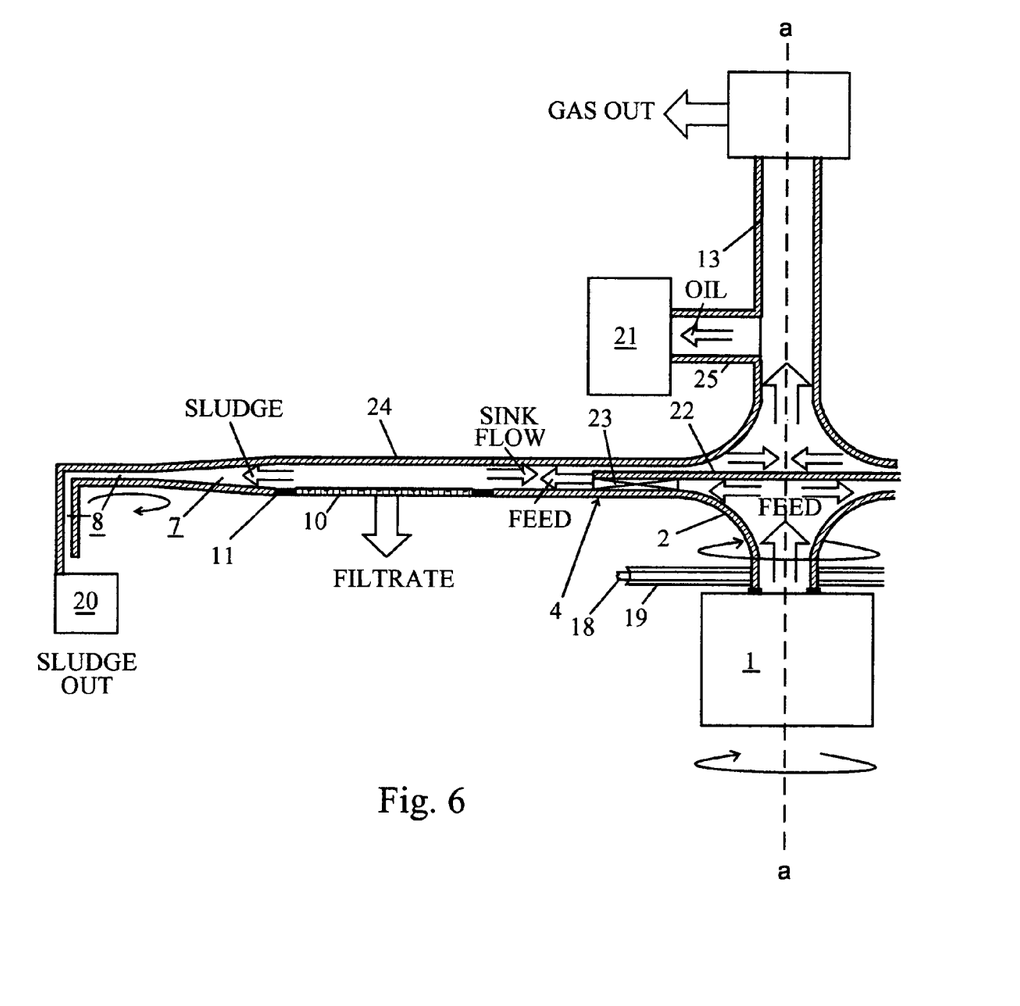
FIG. 6 shows a cross-sectional schematic view of an alternative embodiment, comprising a single impeller opposed to a static top casing.

The impellers are counter-rotatable about a common axis of rotation a-a by suitable means. The means for counter-rotation may be various, including separate motors driving each impeller, belt drives off a common motor, or one or more drive wheels 15 as shown in FIG. 2 and FIG. 3. A support wheel assembly 12 bears the weight of the bottom impeller as it rotates. The support wheel assembly could be provided with a motor and could provide drive means for the bottom impeller 4. Preferably, the impellers 4, 5 rotate in opposite directions at approximately equal angular velocity. FIG. 6 shows an alternative embodiment where only the bottom impeller 4 rotates.

Each impeller comprises a rugose portion 9 upstream of the filter 10 and a rugose portion 9 downstream of the filter at the shear thickening section 8. See FIG. 3 for a detail of the bottom impeller. The rugose portions of each impeller oppose, as is more particularly described in the discussion of FIGS. 4a and 4b. Counter-rotation of opposed impeller rugose portions causes audio frequency shear pulses in the feed, thereby causing gases to evolve and cavitation to occur in resonant degassed bubbles near microbes. Said shear pulses also milk liquid from sludge in the shear thickening section 8.

Evolved noncondensible gases are continuously extracted through the low pressure gradients of the radial vortex trees, as previously described, therefore cavitation bubbles become increasingly rich in water vapor. Noncondensible gases in the cavitation bubbles absorb energy in compression, and when the cushion of noncondensibles disappears, implosion of cavitation bubbles becomes sudden and very energetic, generating very large pressures and even ultraviolet light. Resonance, due to audio frequency pressure pulses from rugose portions counter-rotating, builds up energy in the cavitation bubbles, such that each implosion becomes progressively more energetic, and each consequent explosion produces a stronger pressure pulse against suspended solids, such as microbes. It is like rapid fire depth charges near delicate cell walls.

Although the centrifugal impellers 4, 5 advect fluid radially outward, the net radially outward flow velocity, particularly in the shear layer, is small due to the peripheral impedance of the pinch section 7 and the shear thickening section 8. Therefore there is long residence time for inactivation of microbes between the rugose portions 9. Resonance has a long time to build up energy in the cavitation bubbles near them. Residence time is easily adjustable according to what microbes need to be inactivated.

The bottom impeller 4 comprises an annular high shear crossflow filter 10, which is downstream of the rugose portion 9 of the bottom impeller. See also FIG. 3. The annular high shear crossflow filter 10 is crossflow in two respects: (1) feed flows radially outward from the axis a-a over the filter due to advection by the centrifugal impellers 4, 5 while (2) annular filter rotation shears the feed across said radial flow in a plane approximately parallel thereto. In this embodiment, one continuous annular filter is shown in one impeller. Each impeller could have one or more annular filters, or there could be multiple filters in one or both impellers.

The filter is disposed parallel to said radially outward feed flow, and shears the boundary layer flowing radially outward against the bottom impeller. Rotation of the filter causes fluid adjacent to its surface to rotate along with the filter at the same speed (the no-slip condition). A shear lift force (see FIGS. 7a and 7b) advects suspended solids out of the boundary layer away from the filter, augmenting the separation efficiency for small particles and preventing clogging of the filter pores.

Said orthogonal flows cause swirl vortices in the boundary layer against the filter 10. Liquid, which is less dense than suspended solids in the feed, concentrates at swirl vortex cores, and solids are centrifugated out from the vortex cores to vortex peripheries due to their higher density. Solid thus centrifugally separated agglomerate by collisions at adjacent vortex peripheries where solids are in high concentration and the vortices rotate in opposite directions. The clumps of agglomerated solids are expelled from the boundary layer by shear lift force due to tangential and radial shear. Centrifugation of particles in the helical swirl vortices, together with shear lift force, advects particles away from the filter, leaving a purified boundary layer of water which seeps through the filter and is collected by suitable means. A concentrated slurry remains between the impellers, to be shear-thickened downstream at the impeller periphery.

The multitude of inelastic solids collisions causes the solids to migrate away from the boundary layer against the rotating filter 10 and become tumbled in the shear layer between the impellers, where turbulence agglomerates the solids into larger clumps by many collisions. Clumps in the shear layer snowball as they are bounced around.

The radial passage 6 comprises a pinch section 7 and a shear thickening section 8 at the periphery of the impellers 4, 5. Clumps which escape the turbulent shear layer and are rejected by shear lift from the bottom impeller migrate to boundary layer against the top impeller 5, where they receive a momentum boost impelling them radially outward to the shear thickening section 8 where they are dewatered and shear thickened into a thick sludge which is extruded from the periphery of the impellers and collected by suitable means (not shown). Suitable means, for example scraping, should be obvious to those of ordinary skill in the art.

Those of ordinary skill in the art to which application of this invention pertains will be able to adjust filter rotation speed, filter friction with the feed, pore size, pressure, and other factors to obtain sufficient shear lift force for effective separation in said application.

Seals 11 connecting the crossflow filter 10 to the bottom impeller 4 prevent leakage of unfiltered feed and permit quick filter replacement. For municipal wastewater, where aeration of the filtrate is desired, the filtrate could simply drop into a tank. In other applications, e.g. winemaking, suitable means for collecting filtrate without permitting atmospheric contact, such as an annular chamber disposed beneath the filter and slidably engaging the bottom impeller, could be provided.

Figure 4A:
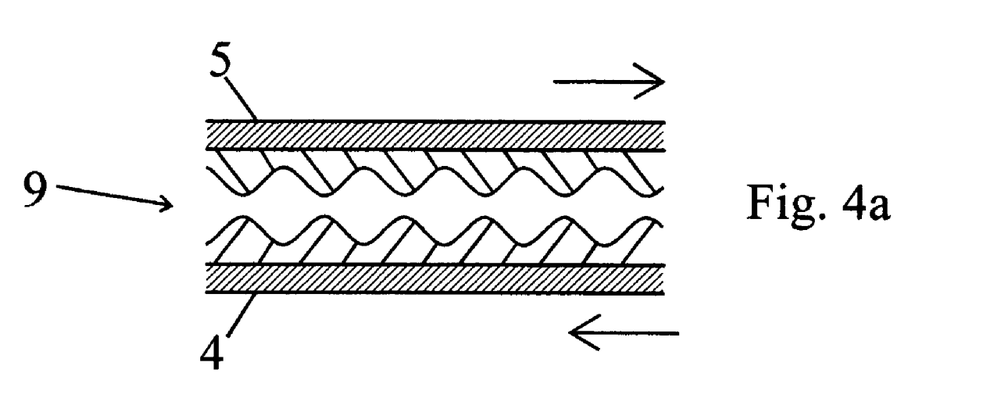
FIGS. 4a and 4b show a detail cross section of opposed rugose portions of impeller surfaces as the impellers counter-rotate.
Figure 4B:
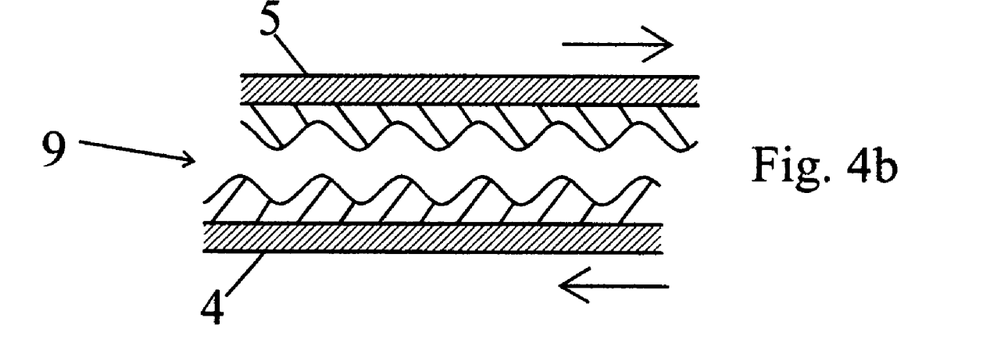
Figures 5A, 5B, 5C:
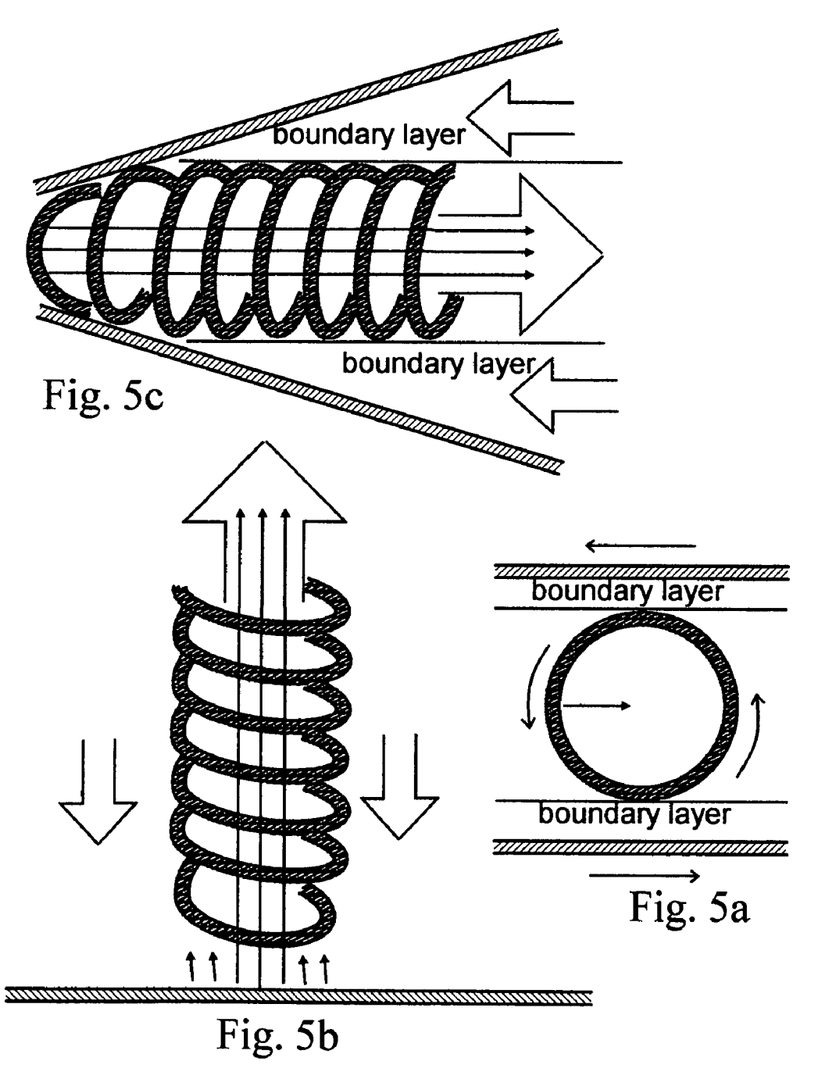
FIGS. 5a, 5b, and 5c explain the vortex-wall interaction.

Solids rejected by the annular high shear crossflow filter 10 as previously stated flow radially outward from the filter 10 into the pinch section 7 of the radial passage 6. At the pinch section 7 the radial vortices formed in the shear layer between the impellers become constricted by wall friction, and axial jets shoot radially inward toward the axis a-a through the radial vortex cores due to the vortex-wall effect, which is shown in FIGS. 5a, 5b, and 5c. The axial jets suck liquid out of the sludge and recirculate liquid toward the filter, leaving behind a thicker sludge being sheared between the impellers. Centrifugal force due to momentum transfer from the impellers forces the sludge into a shear thickening section 8. Preferred rugose surface cross-sections for the shear thickening section 8 are shown in FIGS. 4a and 4b.

Light fractions flow through an axial exhaust conduit 13, sucked by the axial suction pump 14. The axial suction pump 14 could be a steam eductor, a positive displacement pump, or various pumps known to the art, comprising motor means (not shown). The axial suction pump creates a low pressure sink, and flow toward the axis a-a will be referred to as sink flow. Flow in the opposite direction, radially outward from the axis a-a, will be referred to as source flow. Simultaneous source-sink flow between the impellers will be referred to as radial counterflow.

The feed passing from the axial feed conduit 2 into the axial chamber 3 is opened into a cyclone having its axis at the impeller axis a-a. At the cyclone axis, noncondensible gases and VOC vapors evolve in low pressure and go into the axial exhaust conduit 13. As the feed flow radially outward between the counter-rotating impellers, high shear between the impellers 4, 5 forms radial vortices like spokes in a wheel pointing to the impeller axis of rotation, and the radial vortices are low pressure gradients. Noncondensible gases and VOC vapors evolve in the radial vortices and are sucked therethrough to the axis a-a by the work of the axial pump 14. Oils and low density liquids are other light fractions which flow radially inward to the axis a-a, and they may be sucked out from the axial chamber through the axial pump or simply allowed to flow up the axial exhaust conduit 13 and through an aperture (not shown) in the axial exhaust conduit. Centrifugal extraction of light fractions leaves a degassed, oil and volatile free liquid passing radially outward to a crossflow filter 10 in the bottom impeller 4.

Gases and other light constituents, such as oils, flow radially inward through the feed in the radial passage 6 toward the impeller axis a-a in sink flow as feed flows radially outward in source flow. Said simultaneous source-sink flow will be referred to as radial counterflow. Radial counterflow is possible because coherent radial vortices exist in the radial passage 6. Coherent radial vortex trees are sustained by radially inward vortex axis stretching due to the work of the axial pump 14 and the simultaneous radially outward vortex axis stretching due to the work of the counter-rotating centrifugal impellers 4, 5. Radial counterflow protects the filter 10 from oils and gases and also extracts noncondensible gases so as to produce energetic cavitation implosions in resonant bubbles next to microbes.

Suitable means prevent flow of feed into the axial suction pump 14. Said means should be obvious to those of ordinary skill in the art. For example, collars within the axial exhaust conduit preventing liquid from creeping up along the interior, or lengthening the axial exhaust conduit 13 beyond the length which the feed could be lifted by suction without vaporizing. Sufficient centrifugal force due to rotation of the top impeller and friction with the feed forces feed radially outward into source flow from the axial chamber 3 even though some feed may for a time partially intrude into the axial exhaust conduit. Preferably, the top impeller 5 and the axial exhaust conduit 13 are connected together and rotate as a unit.

The annular high shear crossflow filter 10 may be of many materials known to the art, including membranes, sintered metal, ceramics, bundled tubes, and perforated plate. Pore, size may be larger than the particle to be rejected, due to the shear lift force and swirl cleaning in the boundary layer, as previously described. Pressure to force filtrate through the filter is caused by centrifugal force imparted to the feed by the top and bottom impellers together with constriction of radially outward flow due to the pinch section 7 and shear thickening section 8 of the radial passage 6. Back pressure thereby created squeezes liquid against the filter, and the liquid which is squeezed is a purified boundary layer.

The vortex-wall interaction (see FIGS. 5a, 5b, and 5c) of the radial vortices and the peripheral pinch between rugose impellers causes audio frequency axial jets of liquid to squirt radially inward through radial vortex cores, dewatering the sludge being thickened in the shear thickening section 8.

Thickened solids are extruded from the impeller periphery and collected by suitable means (not shown) which should be obvious to those of ordinary skill in the art, such as scrapers and hoppers. A sludge hopper is shown in FIG. 2. The accumulation of sludge at the periphery blocks the radially outward flow of feed and thereby increases residence time for treatment of feed between the impellers, including degassing, microbial inactivation by cavitation at the rugose portions 9, and the shear lift of suspended solids at the annular high shear crossflow filter 10.

Residence time of the feed in the turbulent treatment zone between the impellers can be as long as necessary for effective three way phase separation. Adjustment of the residence time by regulating impeller angular velocity and diameter, axial pump flow, impeller separation, filter pore size, filter area, etc. should be obvious to those of ordinary skill in the art and readily discoverable by experimentation so as to achieve desired process flow and purity.

Another example of application of the device shown in FIG. 1 is treatment of the effluent from wet scrubbing of sulfur dioxide in coal-fired power plant flue gas. Turbulent agitation of the effluent increases probability of contact of sulfur dioxide with limestone, and axial extraction of produced gases as well as extraction of water through the filter favors the forward reaction to form gypsum. Instead of a slow reaction proceeding in voluminous lagoons of toxic waste, an accelerated gypsum forming and thickening process quickly recovers valuable material and recycles water. Likewise the slurry from wet scrubbing of fly ash and aerosols can be quickly dewatered and thickened to produce a thick paste suitable for pressure forming into so-called "green bricks."

Another slurry which could be shear thickened is coal-water or coal-oil. Yet another example is muddy water, such as clay slurries. And yet another is produced brine from oil and gas wells, to separate brine and light hydrocarbons from drilling mud, sand, tar, aliphatic oils, and other viscous or particulate matter.

Another example of application of the device shown in FIG. 1 is oil extraction. Olive oil processing could take place in a shear crusher with simultaneous water removal. No additional heat or high pressure seed crushing would be necessary. Shear between the impellers abrades the olives against each other and releases the oils as the skins and pits tumble in high turbulence. Water goes through the filter, dry pomace is extruded from the impeller periphery, and oil flows through the axial exhaust conduit.

Another oil extraction application is wellhead treatment of produced brine from oil and gas wells. Oils and light fractions are axially extracted and transported from the site, brine goes through the filter and can be discharged, and sand, tar, mud, and other heavy fractions are shear thickened into a dewatered sludge.

The device shown in FIG. 1 could be used for field purification of drinking water in developing countries, powered by vehicle tires or human bicycle power. Noxious gases are axially extracted, microbes are inactivated by cavitation and excluded by dynamic filtration, and suspended solids, including mud, algae, amoebas, etc., are concentrated into a thick sludge which is easily transportable for use in agriculture. What flows through the filter is potable water, even from high turbidity sources. No chemical treatment is necessary.

FIG. 2 shows a continuation of the preferred embodiment shown in FIG. 1, detailing the preferred means for causing counter-rotation of the impellers 4, 5. A drive wheel 15 engages the top and bottom impellers. The drive wheel is preferably synthetic rubber, such as a truck tire or a bicycle tire. A drive motor 17 turns a drive spindle 16 connected to the drive wheel 15. The impellers 4, 5 in contact with the drive wheel 15 counter-rotate in opposite directions at approximately the same angular velocity. The drive motor 17 could be various devices, for example, an electric motor, internal combustion engine, or a pedal-powered device operated by a person. Sludge extruded from between the impellers drops into a sludge hopper 20.

FIG. 3 shows a bottom view of the bottom impeller 4. The annular high shear crossflow filter 10 is radially distal to the axial feed conduit 2 and the rugose portion 9. The filter 10 rotates along with the bottom impeller 4 in the direction shown by the arrow. Two drive motors 17 are shown along with their associated drive wheels 15 shown in hidden lines because the bottom impeller blocks them from sight. Three or more drive motors and drive wheels could be used. Or one drive motor and drive wheel, with other wheels not driven by motors but maintaining disk separation. Other drive means modifications will be obvious to those skilled in the art. Another rugose portion 9 is at the shear thickening section 8, which is distal to the pinch section 7.

FIG. 4a and FIG. 4b show a detail of a rugose portion of the impellers of the preferred embodiment. The view is from the impeller axis of rotation a-a and the impellers are shown in cross section, showing a rippled structure. A rugose portion of the bottom impeller 4 opposes a rugose portion of the top impeller 5 upstream of the filter 10 and also downstream of the filter, at the shear thickening section 8. Direction of impeller rotation is indicated by arrows.

The ripples of the rugose portions on each impeller define peaks and valleys. The peaks are portions of the surface which are close to the opposite impeller, and the valleys are far away. When peaks oppose peaks, valleys oppose valleys, as shown in FIG. 4a. Continuing counter-rotation of the impellers, peaks oppose valleys, as shown in FIG. 4b. The cross-sectional surface area between the impellers remains the same during impeller counter-rotation but the equidistant separation of FIG. 4b becomes varying separation in FIG. 4a. Vortices form between valleys, and the vortex cores eject water and gases in axial jets due to the vortex-wall interaction when they are squeezed between peaks, as the FIG. 4a situation becomes that of FIG. 4b. The axial jets dewater the sludge in the sludge thickening section 8 in a high frequency pumping operation; and the high shear between peaks causes suspended solids such as fly ash, sand, gypsum, calcium carbonate, and bentonite clay to agglomerate into a thick sludge. Dewatering of the sludge, plus collision and coherence of particles in the flow cause shear thickening.

Additionally, high shear stress between peaks causes cavitation in the feed. Cavitation preferentially occurs where there are structural weaknesses in the water, and these weaknesses exist where there are microbes and their associated bubbles of noncondensible gases. These noncondensibles are sucked away by cavitation, depriving the microbes of needed gases. The noncondensibles then join the sink flow and are axially extracted from the rugose portion 9. Evolved noncondensibles from the water surrounding the microbes also are axially extracted. Cavitation bubbles expand in the space between valleys, until continued rotation brings about the situation of FIG. 4b, where cavitation bubbles are squeezed and collapse, then expand explosively. Numerous ripples on the impellers and high rotation speed cause audio frequency high-low pressure cycles and resonant cavitation.

Figure 7A:
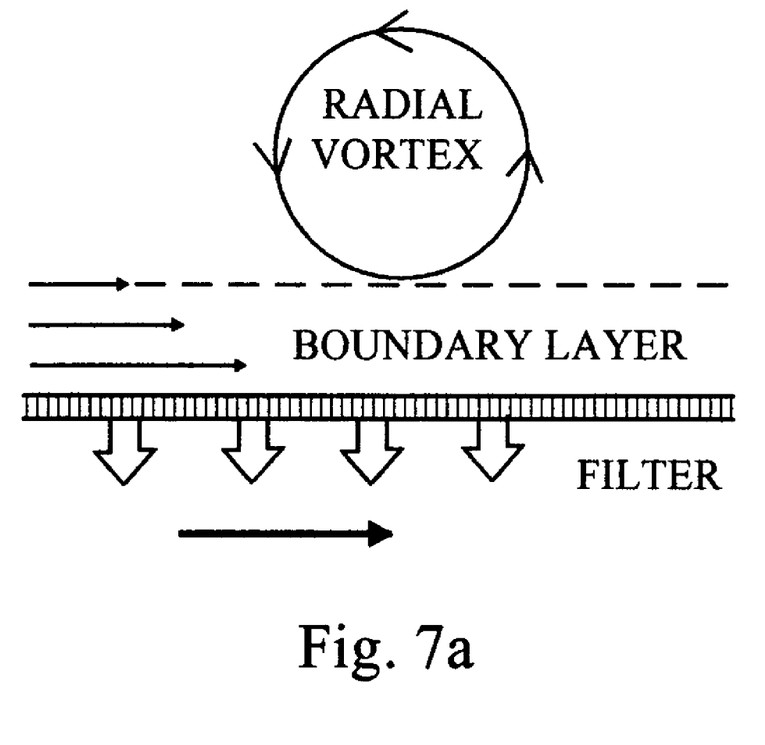
FIG. 7a shows a detail of fluid flow next to the filter.
Figure 7B:
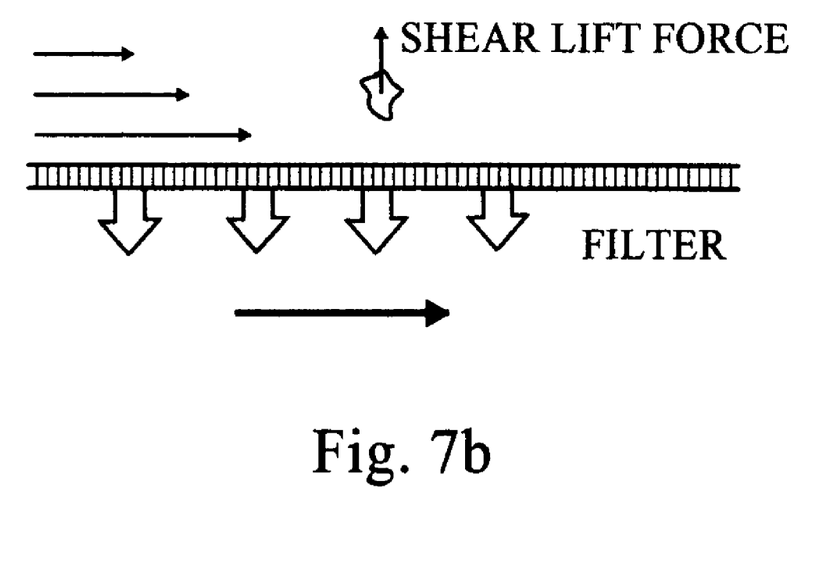
FIG. 7b shows a further detail of fluid flow next to the filter, and the shear lift force.

Audio frequency cavitation cycles between the rugose portions 9 of the impellers, together with said continuous degassing, results in resonant cavitation bubbles at or near microbial surfaces which have lost their cushion of noncondensible gases. Without noncondensibles to absorb energy in compression, implosion of cavitation bubbles becomes sudden and highly energetic, resulting in rupture of nearby microbial membranes and even irradiation by locally generated ultraviolet light (sonoluminescence). Cavitation destroys amoebas, bacteria, viruses, worms, snails and other pathogens in sludge flowing through the shear thickening section 8 as well as pathogens pathogens flowing toward the filter 10 through the radial passage 6.

High frequency high shear cycles between gently undulating surfaces also aids fruit crushing for winemaking, olive oil extraction, juicemaking, and other applications.

FIGS. 5*a*, 5*b*, and 5*c* illustrate the vortex-wall interaction. See also V. Shtern, et al., "Collapse, Symmetry Breaking, and Hysteresis in Swirling Flows." Ann. Rev. Fluid Mech. 1999, 31:537-66, particularly FIG. 1 on p. 540. When the end of a vortex encounters an impedance to its rotation, e.g. a tornado touching down, the result is a strong axial jet along the vortex core in a direction away from the impedance. Rotation slowed by drag at the vortex end causes a radially inward squeeze. Another example of this phenomenon is the Ranque-Hilsch vortex tube. In the present invention, the vortex-wall interaction occurs as the radial vortices in the shear layer between the impellers encounter the pinch section 7 of the radial passage, and also as the swirl vortices from the filter encounter the top casing in FIG. 6.

In FIG. 5*a*, a centripetal force is shown. When the vortex tip encounters an impedance, the friction opposes tangential velocity of fluid and thereby contributes to the centripetal force and drives an axial jet of fluid up the vortex core, as shown in FIG. 5*b*. If, instead of a wall, the vortex encounters a pinch, as shown in FIG. 5*c*, an axial jet also occurs. This rebound jet from a vortex encountering an impedance creates a back pressure from the impeller periphery, which assists sink flow and advects water back to the vicinity of the filter 10.

FIG. 6 shows an alternative embodiment, having a single impeller 4, comprising an annular high shear crossflow filter 10 as shown in FIG. 3. Many means for causing rotation of the impeller 4 are known to the art. The impeller rotates about the axis a-a. The drive means shown is a belt capstan 19 and a belt 18 which is connected by suitable means to a motor (not shown). A support wheel as shown in FIG. 1 preferably supports the impeller as it rotates. The support wheel could also be a drive wheel.

A baffle 22 connected to the bottom impeller 4 by spiral runners 23, rotates along with the bottom impeller. The baffle prevents feed flow from entering directly into an axial exhaust conduit 13. The baffle, bottom impeller, and runners constitute a centrifugal pump, and the work of the centrifugal pump drives feed radially outward away from the axis a-a and through a radial passage 6 defined by the bottom impeller and a static top casing 24. Preferably, the surfaces of the bottom impeller and the ton casing between the end of the baffle 22 and the beginning of the filter 10 are rugose, as shown in FIG. 4.

At the center of the top casing and above the baffle 22 is the axial exhaust conduit 13, and branching from the axial exhaust conduit is an oil conduit 25. Evolved noncondensible gases, volatile vapors, oils, and other low density fluids flow radially inward in sink flow and accumulate in the axial exhaust conduit 13. An axial pump 14 as shown in FIG. 1 could aid sink flow. Oils flow through an oil conduit 25 and are collected in a receptacle 21. Water flows through the filter 10. High density constituents in the feed, such as seeds, skins, mud, microbes, or other suspended particles, flow radially outward into the shear thickening section 8 of the radial passage 6. At the shear thickening section 8 preferably the surfaces of the bottom impeller 4 and the top casing 24 are rugose as shown in FIG. 4.

Rotation of the filter 10 causes shear lift, rejecting particles which might otherwise accumulate and blind the filter. A purified and degassed boundary layer rotates along with the filter 10 and back pressure from radially outward flow impedance causes the boundary layer to flow through the filter. Swirl vortices arise from the filter surface due to the orthogonal radially outward flow of the boundary layer and the rotary flow of the boundary layer. Back pressure pushes liquid toward the filter through the swirl vortex cores, and the swirl vortex cores are centrifugally purified of solids. Additionally, when the swirl vortices impinge the top casing, the vortex-wall interaction drives a jet back through the vortex cores toward the filter. Centrifugation of solids in the high g swirl rebound vortices of the vortex-wall interaction prevents solids from joining the axial jets. Solids swirl away from the filter and concentrate in the pinch section 7. Swirl pinch in the pinch section and in the shear thickening section 8 causes back pressure driving water back from the pinch section to the filter. The liquid phase accumulates in the boundary layer against the filter, while solids agglomerate through collisions in turbulence and are thickened in high shear in the shear thickening section until they drop into a sludge hopper 20.

For example, scrubbing slurry produced by sulfur dioxide and fly ash treatment of coal-fired flue gas can be dynamically dewatered in high volume and thickened into valuable gypsum or fly ash paste, eliminating the necessity for settlement ponds or tanks which take up precious space near power plants.

It should be noted that the residence time of process fluid mixtures can easily be made as high as necessary for effective solid-liquid-gas separation by regulating the separation at the shear thickening section, the impeller rotation speed, the impeller diameter, the filter pore size, and the flow through the axial exhaust conduit.

FIG. 7*a* and FIG. 7*b* explain the shear lift force which advects suspended solids away from the surface of the rotating and centrifugating filter. A boundary layer rotates along with the filter. A linear fluid velocity profile is shown at the left, indicating fluid velocity is faster at the impeller surface than at the edge of the boundary layer. This is a simplification, because there is a turbulent shear layer immediately above the boundary layer and there is also an orthogonal flow due to centrifugation of the boundary layer by the impeller. However, these complications are not necessary to consider to understand the basic theory of shear lift force on particles in a boundary layer contiguous to a moving filter, so this idealized velocity profile will be used for purposes of illustration. The direction of filter movement is shown by the arrow.

In FIG. 7*b*, a particle suspended in the boundary layer is rejected into the turbulent shear layer due to a shear lift force. The direction of the shear lift force is away from the filter. The fluid next to the filter moves at differing velocities, according to the velocity profile shown at the left. The fluid in layers closer to the filter is equal in mass but higher in velocity, therefore closer layers have higher momentum.

Considering the velocity profile across a particle drifting along with the boundary layer, the bottom layers of the profile impart more momentum to the particle than the top layers, as they all push it along with momentum transferred from the filter. The momentum of the particle will therefore acquire an an upward component, which is the shear lift force. The result is that the particle migrates away from the high momentum layers into more tranquil flow at the periphery of the boundary layer, where the impeller momentum has diffused by water viscosity and the momentum of the fluid layers is small. Thence the particle enters the shear layer where it flows radially outward in high turbulence, colliding and agglomerating with other particles to form a sludge. The high residence time of fluid above the annular high shear crossflow filter 10 disclosed in the present invention allows for the shear lift force to have time to operate so as to create a purified boundary layer against the filter. The boundary layer is continuously extracted through the filter and renewed by feed flow.

The rotational inertia of the impellers of the present invention is high due to the high impeller radius compared to the small radius of multidisk rotary microfilters. The associated fluid layers on the broad surface of the impellers of the present invention are much more voluminous than those on multidisk rotary microfilters. Therefore there is high axial stability in the rotary filter of the present invention, which is a significant advantage over multidisk crossflow filters. Even at moderate rotation speeds, the tangential velocity at the annular filter surface can be as high or higher than the tangential velocity at the multidisk surfaces. Therefore the shear lift is higher.

Further Discussion

A radial impedance slows centrifugal flow and provides long residence time in the processing zone between the impellers. A narrowing to closer impeller separation is one form of radial impedance because it creates drag force. This is shown in FIG. 1. The narrowing also causes back pressure by the vortex-wall interaction, as explained in the discussion of FIGS. 5a-c. Another form of radial impedance is a shrouding wall of a static casing, as shown in FIG. 6. The shrouding wall is a physical barrier across the radial passage at the periphery. The advantage of long residence time is that shear lift, cavitation purification, gas evolution, and three way phase separation processes have sufficient time to be effective. Although the centrifugal impellers powerfully advect fluid radially outward through the radial passage, confinement by the radial impedance keeps the radially outward flow velocity low so that feed lingers between the impellers.

The radial impedance also causes a radially inward force, due to the vortex-wall interaction, as explained in the discussion of FIGS. 5a-c. This back pressure drives light fractions such as oils through the radial vortex cores back to the impeller axis of rotation.

The axial suction pump 14 shown in FIG. 1 also assists sink flow of light fractions and maintains coherence of the radial vortices by stretching the vortex axes. In FIG. 6, the axial suction pump could be used, or in applications where simplicity is desired, such as field water purification, a check valve could be used in place of the axial suction pump. Back pressure in that case would drive noncondensible gases through the vortex cores to be exhausted through the axial exhaust conduit 13 or the check valve.

The rugose portions 9 could be of many different shapes. Shown in FIGS. 4a-b are counter-rotating corrugated impeller surfaces. Opposed corrugated surfaces of a static casing and a rotating impeller are another possibility, as shown in FIG. 6. Another shape could be spiral vanes. Yet another could be bumps. And yet another could be waffle grid indentations. The rugose portions serve to advect feed radially outward and to shear the feed so as to evolve gases and to cause cyclic cavitation for microbial inactivation or crushing applications.

The annular high shear crossflow filter 10 is far enough away from the axis of rotation that a moderate impeller angular velocity can produce a high tangential filter velocity, for strong shear lift force against particles in the boundary layer. For an impeller 4 having a large diameter, there would be high axial stability and low wobble when said filter angular velocity is present. This is an advantage over the multidisk shaft crossflow filter. Another advantage is that oils, gases, and light fractions which might blind the filter are removed by three way phase separation before most of them can reach the filter. Any oils reaching the filter are repelled from the filter surface by shear lift force due to their higher viscosity than water. High viscosity constituents as well as suspended solids cannot conform to the velocity profile of the flow around them, and migrate away from high momentum layers of the fluid, which are next to the filter.

Shown in FIG. 1 is an annular high shear crossflow filter 10 in one continuous ring, but the term "annular high shear crossflow filter" should also be interpreted to mean a number of discrete filters in an annular band, for easier replacement and maintenance, and multiple annular bands. The filter 10 could be in either the top impeller or the bottom impeller, or both. In the alternative embodiment shown in FIG. 6, a filter could be in the impeller 4 and/or in the casing, but a moving filter in the impeller is preferred for better shear lift force. Of course, in FIG. 6, the impeller could be above the casing 24 instead of below as shown, in an upside down arrangement. The advantage of the arrangement shown in FIG. 6 is that evolved gases and oils would by their bouyancy go away from the filter instead of into it.

Fields of application of the present invention include swimming pool filters. Oils and floating solids such as hair are axially extracted through the axial exhaust conduit 13 while the water goes through the annular high shear crossflow filter 10 and heavy solids pass through the periphery. Microbial inactivation by cavitation at the rugose portions would eliminate the need for chlorine. Oils and solids are repelled from the filter by shear lift force due to their higher viscosity than water, and by their buoyancy.

Produced brine from oil wells is a high volume stream which should be separated at the wellhead to reduce transportation costs and the costs associated with settlement ponds or tanks. For offshore operations, this need is particularly acute. Gasoline could be stripped from the brine and axially extracted as product, water passed through the filter 10 and discharged as harmless waste or desalinated, and the heavy oils, sand, tar, drilling mud, etc. agglomerated into compact dewatered sludge for transport.

Whitewater from paper mills contains fine cellulosic suspensions, which could be recovered by means of the present invention. Blood cells could be separated from plasma without crushing centrifugal force. Fruit juice could be extracted with skin flavors and without seed flavors, and the juice dynamically filtered to remove even fine particles.

Milk could be dynamically homogenized and pasteurized by the rugose portions 9. Other food products could be processed to inactivate microbes without added chemicals, in high volume continuous processes.

Means for shear thickening are closely spaced surfaces in relative motion, such as counter-rotating disks whose separation tapers at their periphery to become constantly close, rugose surfaces, where close separation is periodic, as explained under FIG. 4. A milking effect from the periodic opposition of rugose peaks extracts liquid and thereby thickens sludge. Continuous radial counterflow of solids radially out and liquids radially in from the radial impedance causes shear thickening. There are also characteristics of the fluid mixture itself, such as fly ash slurries, which are shear thickening even without means for water extraction.

It should be apparent to those of ordinary skill what particular applications of the novel ideas presented here may be made given the description of the embodiments. Therefore, it is not intended that the scope of the invention be limited to the specific embodiments described, which are merely illustrative of the present invention and not intended to have the effect of limiting the scope of the claims.

I claim:

1. An apparatus for continuous three way phrase separation of a fluid mixture, comprising:
    counter-rotatable approximately parallel centrifugal impellers, the impellers having a common axis of rotation at their center and defining between them a radial passage, the radial passage having a radial impedance for increasing residence time of fluid within the radial passage;
    at least one of said impellers comprising at least one annular high shear crossflow filter disposed approximately parallel to said radial passage and distal to said impeller axis of rotation;
    means connected to the impellers for causing counter-rotation about the axis of rotation at approximately equal but opposite angular velocity;
    an axial suction pump;
    an axial exhaust conduit communicating with the axial suction pump and with the radial passage at said impeller axis of rotation; and
    a feed conduit communicating with a fluid mixture feed source and with the radial passage at the axis of rotation.

2. The apparatus of claim 1, wherein said axial suction pump is a steam eductor.

3. The apparatus of claim 1, comprising a shear thickening section at the periphery of the impellers and distal to the filter with respect to the axis of rotation.

4. The apparatus of claim 3, wherein said shear thickening section comprises rugose impeller portions.

5. The apparatus of claim 1, wherein said means for causing counter-rotation comprise a drive wheel and a motor connected thereto, the drive wheel engaging the impellers simultaneously at their periphery.

6. The apparatus of claim 1, wherein the impellers comprise opposite rugose portions between the filter and the axis of rotation.

7. Apparatus for microbial inactivation by cavitation, comprising:
    at least one rotatable centrifugal impeller, the impeller having an axis of rotation at its center and comprising a rugose portion and an annular high shear crossflow filter, said filter disposed distal to said rugose portion with respect to the axis of rotation;
    means connected to the impeller for causing rotation of the impeller about the axis of rotation and thereby causing flow of a fluid radially outward away from said axis of rotation and over said rugose portion to said filter;
    a surface disposed approximately parallel to said impeller, the surface comprising a rugose portion opposing at least part of said rugose portion of the impeller and the surface and the impeller defining between them a radial passage, the radial passage having a radial impedance;
    an axial exhaust conduit communicating with the radial passage at the axis of rotation; and
    an axial feed conduit communicating with the radial passage at the axis of rotation.

8. The apparatus of claim 7, comprising an axial suction pump communicating with the axial exhaust conduit.

9. The apparatus of claim 7, comprising a shear thickening section at the periphery of the radial passage.

10. The apparatus of claim 9, wherein said shear thickening section comprises opposed rugose portions of the centrifugal impeller and said surface.

11. The apparatus of claim 7, wherein said surface is a rotatable rugose centrifugal impeller connected to means for causing it to rotate in an opposite direction to said impeller.

12. An apparatus for continuous three way phase separation of a fluid mixture, comprising:
    a centrifugal impeller, the impeller having an axis of rotation at its center, and the impeller comprising an annular high shear crossflow filter distal to the axis of rotation;
    a static casing disposed opposite to said impeller and its filter such that the impeller and the casing define between them a radial passage, the radial passage having a radial impedance for increasing residence time of fluid within the radial passage and over the annular filter;
    means connected to the impeller for causing rotation of the impeller and its annular filter about the axis of rotation and thereby causing flow of a fluid radially outward away from said axis of rotation and over the annular filter to the radial impedance;
    an axial exhaust conduit communicating with the radial passage at the axis of rotation; and
    an axial feed conduit communicating with the radial passage at the axis of rotation.

13. The apparatus of claim 12, comprising an axial suction pump communicating with the axial exhaust conduit.

14. The apparatus of claim 13, wherein the axial suction pump is a steam eductor.

15. The apparatus of claim 12, comprising a check valve on the axial exhaust conduit.

16. The apparatus of claim 15, comprising an oil conduit communicating with the axial exhaust conduit before the check valve.

17. The apparatus of claim 12, comprising opposing rugose portions on the impeller and on the casing, the rugose portion on the impeller being between the filter and the axis of rotation.

18. The apparatus of claim 12, comprising means for shear thickening distal to the filter with respect to the axis of rotation.

19. The apparatus of claim 18, wherein said shear thickening means comprise opposed rugose portions on the impeller and on the casing.

* * * * *